United States Patent [19]

Takubo et al.

[11] Patent Number: 4,531,159
[45] Date of Patent: Jul. 23, 1985

[54] IMAGE PICKUP DEVICE HAVING A HOLDING PART

[75] Inventors: Takayuki Takubo, Yokohama; Yoshichi Otake, Kamakura, both of Japan

[73] Assignee: Victor Company of Japan, Kanagawa, Japan

[21] Appl. No.: 456,784

[22] Filed: Jan. 10, 1983

[30] Foreign Application Priority Data

Jan. 19, 1982 [JP] Japan ................................. 57-6569

[51] Int. Cl.³ ............................................. H04N 5/30
[52] U.S. Cl. ...................................... 358/229; 352/34; 358/906
[58] Field of Search ................. 358/229, 906; 352/242, 352/243, 95, 34, 197; 354/81, 82, 293, 288, 295

[56] References Cited

U.S. PATENT DOCUMENTS 4,368,490 1/1983 Takimoto ............................ 358/906

FOREIGN PATENT DOCUMENTS

54-106119 8/1979 Japan .
445784 10/1934 United Kingdom .
1071482 6/1967 United Kingdom .
2069174 1/1981 United Kingdom .

Primary Examiner—John C. Martin
Assistant Examiner—Michael Dunnam
Attorney, Agent, or Firm—Ladas & Parry

[57] ABSTRACT

An image pickup device comprises a main image pickup body, and a holding part provided angularly rotatable on one side surface of the main image pickup body. The holding part is mounted to rotate angularly in a plane other than a plane which is parallel to a vertical plane, where this vertical plane includes a center of gravity of the image pickup device and an optical axis or a straight line parallel to the optical axis of the image pickup device. The holding part is separated by a predetermined distance from the one side surface of the main image pickup device at an accommodated position thereof where the holding part extends along the one side surface of the main image pickup body, and a free end of the holding part lies substantially within the above vertical plane at a fully rotated position thereof where the holding part is drawn out in front of the main image pickup body.

10 Claims, 8 Drawing Figures

IMAGE PICKUP DEVICE HAVING A HOLDING PART

BACKGROUND OF THE INVENTION

The present invention generally relates to image pickup devices having a holding part, and more particularly to an image pickup device which can be supported in a balanced state at each of angularly rotated positions of an angularly rotatable holding part thereof, so that the image pickup device can be operated with ease.

Recently, especially due to downsizing of recording and/or reproducing apparatuses for home use, television cameras are also becoming downsized. In some compact type television cameras, the recording and/or reproducing apparatus is unitarily built-in within the camera. The compact type television cameras are generally provided with a holding or gripping part, and an operator holds this holding part when operating the compact type television camera to carry out the image pickup.

Conventionally, as an example of a television camera having such a holding part, there was a television camera provided with the holding part at a bottom surface of a main camera body. However, the position of the holding part is fixed in the television camera having such a design, and the operating position and usage of the television camera accordingly become limited. Hence, a method may be considered to operate the television camera at desired positions, by designing the holding part as a detachable member so that the holding part may be detachably mounted at predetermined positions of the main camera body. However, if the holding part is designed as a detachable member, the holding part must be detached from one mounting position and mounted onto another mounting position every time the television camera is to be operated, and the operation of the television camera becomes quite troublesome to perform. Furthermore, if a plurality of mounting positions are provided on the main camera body for mounting the holding part, the external appearance of the television camera becomes spoiled, and the cost of the device becomes high.

As another example of a conventional television camera having a holding part, there was a television camera having a holding part which is mounted angularly rotatable on a side surface of the main camera body. The angularly rotatable holding part may be locked at a predetermined angularly rotated position, and the operator operates the television camera by locking the holding part at a predetermined angularly rotated position according to his needs. The holding part may be locked at three angularly rotated positions, for example, and assume an accommodated position extending along the side surface of the main camera body, a fully rotated position drawn to the front of the main camera body, and an intermediate position between the accommodated position and the fully rotated position. Generally, when the television camera is directly placed onto the floor or a tripod for image pickup, the television camera is operated in a state where the holding part is locked at the accommodated position. When the television camera is operated in a state where the holding part is locked at the fully rotated position, the operator supports a rear part of the television camera by his shoulder and operates the television camera while holding the holding part. Further, if the television camera is to be operated in a state where the television camera is supported at the operator's side or when a high or low angle image pickup is to be carried out, the holding part is locked at the intermediate position and the operator holds the holding part while carrying out the image pickup.

However, in the above television camera, the holding part is mounted parallel to the side surface of the main camera body and rotates angularly about an axis which is perpendicular to the side surface of the main camera body. Accordingly, when the holding part is locked at the accommodated position, various manipulating buttons and the like provided on the holding part become difficult to manipulate. Hence, in order to improve the manipulation characteristic of the above manipulating buttons and the like when the holding part is locked at the accommodated position, a method may be considered to mount the holding part relatively separated from the side surface of the main camera body. However, although the manipulation characteristic of the manipulating buttons and the like will be improved when the holding part is locked at the accommodated position by the above described design, it becomes extremely difficult to support the television camera by holding the holding part when the holding part is locked at the intermediate position or the fully rotated position, because the holding part rotates angularly in a plane parallel to the side surface of the main camera body and the holding part is greatly shifted from the center of gravity of the television camera at the intermediate and fully rotated positions of the holding part. That is, the television camera becomes unbalanced at the intermediate and fully rotated positions of the holding part.

In addition, if the holding part is mounted parallel to the side surface of the main camera body, the holding part at its fully rotated position is shifted from a vertical plane which includes the center of gravity of the main camera body and is parallel to or includes the optical axis of the main camera body. Therefore, there is a disadvantage in that it is extremely difficult to balance the television camera at the fully rotated position of the holding part and the television camera thus becomes difficult to operate. The above disadvantage becomes notable especially when the holding part is mounted so as to be relatively separated from the side surface of the main camera body.

SUMMARY OF THE INVENTION

Accordingly, it is a general object of the present invention to provide a novel and useful image pickup device having a holding part, in which the above described disadvantages have been eliminated.

Another and more specific object of the present invention is to provide an image pickup device which can be supported in a balanced state at each of angularly rotated positions of the holding part where the holding part is in the vicinity of a vertical plane including the center of gravity of the image pickup device and an optical axis or a straight line parallel to the optical axis of the image pickup device and operated with ease, by providing the angularly rotatable holding part so that a rotary axis thereof is shifted by a predetermined angle from a straight line which is perpendicular to a vertical plane including the optical axis of the image pickup device.

Still another object of the present invention is to provide an image pickup device designed so that a rotary axis of the angularly rotatable holding part is shifted by a predetermined angle from a straight line which is perpendicular to a vertical plane including an optical axis of the image pickup device, and the holding part comprises a bend at a part thereof so that the holding part extends substantially parallel to a side surface of a main pickup body when the holding part is at an accommodated position. According to the image pickup device of the present invention, the image pickup device can be supported in a balanced state at each of angularly rotated positions of the holding part, and the image pickup device can be operated with each at each of these angularly rotated positions of the holding part. Moreover, the holding part does not unnecessarily separate in excess from the side surface of the main pickup body.

Other objects and further features of the present invention will be apparent from the following detailed description when read in conjunction with the accompanying drawings.

DETAILED DESCRIPTION

Figure 1:
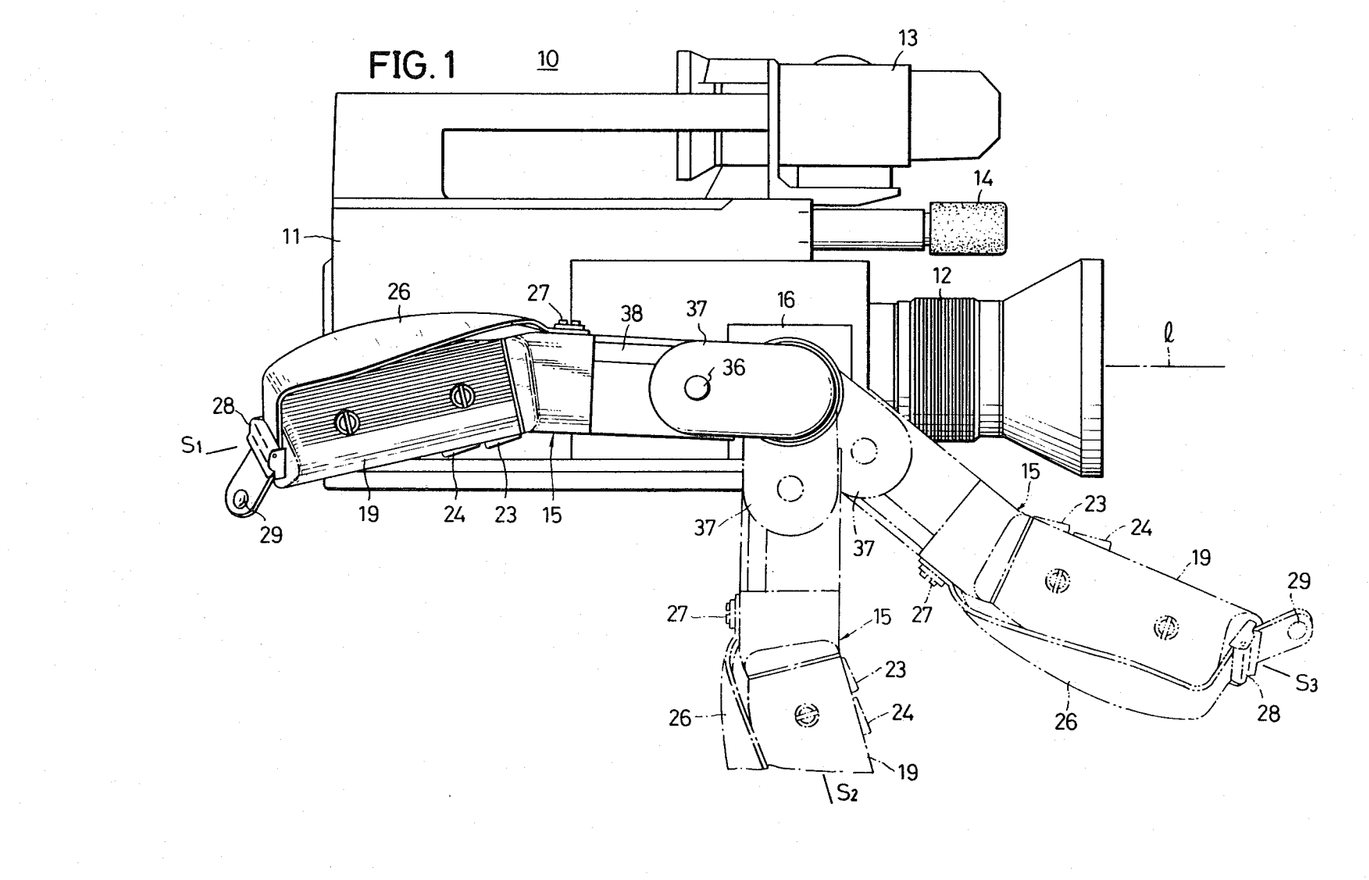
FIG. 1 is a side view showing an embodiment of an image pickup device according to the present invention.
Figure 2:
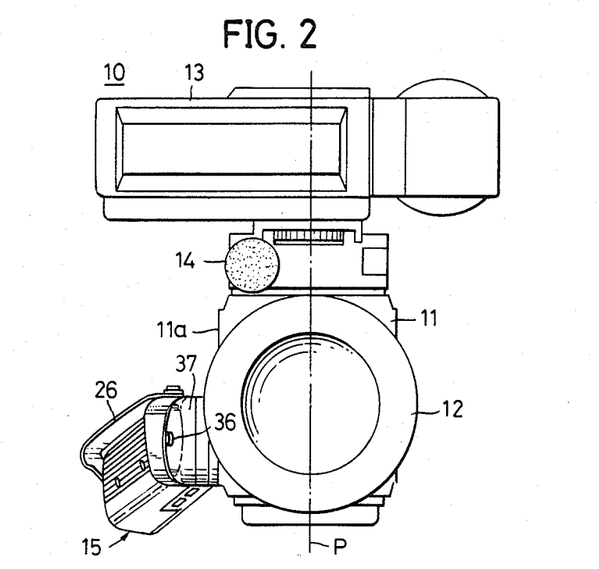
FIG. 2 is a front view showing the image pickup device shown in FIG. 1.

In FIGS. 1 through 4, an image pickup device (hereinafter simply referred to as a camera) 10 comprises a main camera body 11, a zoom lens system 12, an electronic view finder 13, a microphone 14, a holding part 15, and the like. In FIG. 1, a one-dot chain line l indicates an optical axis of the camera 10, and in FIGS. 2 and 3, a one-dot chain line P indicates a vertical plane including a center of gravity of the camera 10. In the present embodiment of the invention, side surfaces of the main camera body 11 lie on vertical planes. Accordingly, if the above optical axis l and the side surfaces of the main camera body 11 are parallel to each other, the above vertical plane P includes both the optical axis l and the center of gravity of the camera 10.

Figure 3:
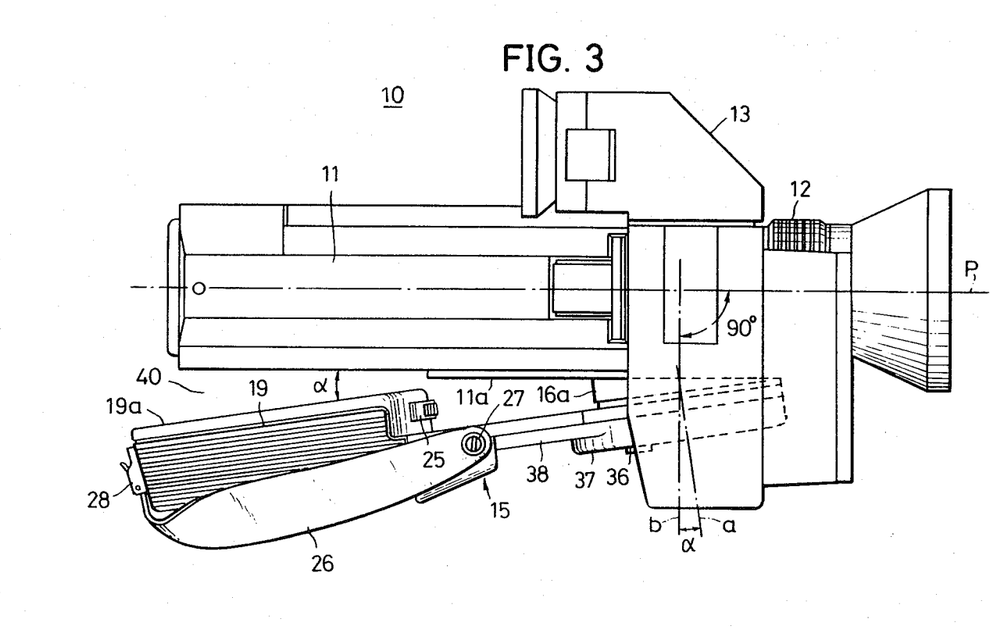
FIG. 3 is a plan view showing the image pickup device shown in FIG. 1.

In the present embodiment of the invention, the holding part 15 is mounted angularly rotatable on a cylindrical projection 16a of a holding part mounting part 16 which is fixed on a left side surface 11a of the main camera body 11 by screws. A rotary axis a of the holding part 15 is horizontal, for example, and is inclined by a predetermined angle α towards the front of the camera 10 with respect to a straight line b which is perpendicular to the left side surface 11a of the main camera body 11, that is, the vertical plane P, as shown in FIG. 3. The angle α is set to an angle in the range of 7° to 10°, for example.

Figure 4A:
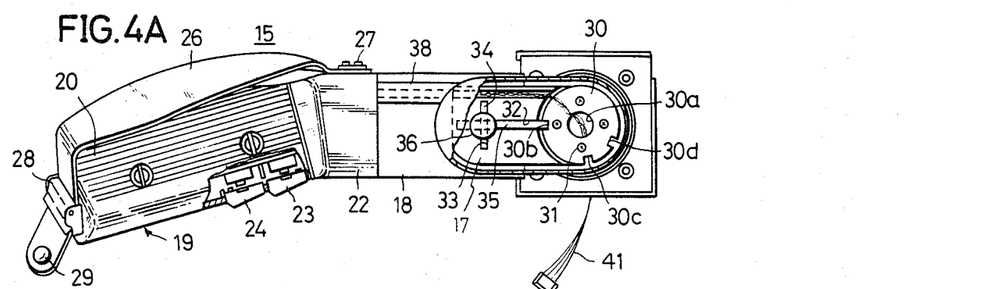
FIG. 4A is a side view showing a holding part of the image pickup device shown in FIG. 1 in a state where a cover of a rotary shaft part thereof is removed.

The holding part 15 comprises a base part 17, an arm plate 18 connecting to the base part 17, and a grip part 19 provided at a free end of the holding part 15. The grip part 19 comprises covers 20 and 21, and an intermediate part 22 which connects the grip part 19 to the arm plate 18. As shown in FIGS. 1 and 4A, the holding part 15 is slightly bent at the intermediate part 22 in the side view. The covers 20 and 21 are respectively fixed to the arm plate 18 by screws. An adjusting button 23 for widening the view of the lens system 12, an adjusting button 24 for adjusting and operating the lens system 12 as a telephoto lens, and a start button 25 for starting the image pickup, are respectively arranged and provided at a part of the cover 21 closer to the intermediate part 22. In addition, a strap 26 is provided on the holding part 15 so as to enable positive support of the camera 10 at the grip part 19. One end of the strap 26 is fixed to the intermediate part 22 by a screw 27, and the other end is pinched by a strap stopper 28 which is fixedly provided at an end of the grip part 19. The length of the strap 26 is adjusted by the strap stopper 28, and the strap 26 is prevented from slipping out of the strap stopper 28 by a stopper 29 provided at the free end of the strap 26.

Figure 4B:
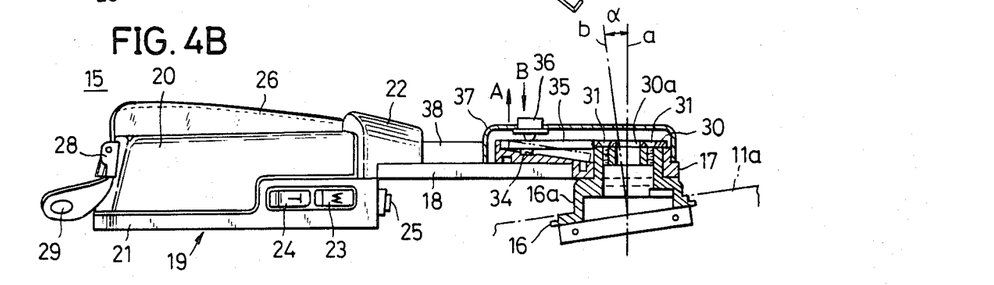
FIG. 4B is a plan view, with a part cut away, showing, the rotary axis part of the holding part in cross section.

A tip end of the cylindrical projection 16a of the mounting part 16 is fitted within a circular opening in the base part 17, and a disc-shaped holding plate 30 is fixed to the cylindrical projection 16a by four screws 31 in a state where the base part 17 is freely rotatable. A central hole 30a is provided in the holding plate 30. In addition, cutouts 30b, 30c, and 30d are formed at the periphery of the holding plate 30 with predetermined angular intervals. Widths of these cutouts 30b through 30d are set so that a locking member 35 which will be described hereinafter can enter within the cutouts 30b through 30d. A slot 32 is formed in the base part 17 along the diametral direction of the holding plate 30, and further, a slot 33 is formed in the base part 17 perpendicular to the slot 32. A leaf spring 34 fits within the slot 33, and the locking member 35 fits within the slot 32 on top of this leaf spring 34. The slot 32 increases in depth towards the holding plate 30. A push button 36 is placed on the locking member 35 at a position where the two slots 32 and 33 intersect, and a cover 37 having a hole through which the push button 36 can project holds the bush button 36 in place. The cover 37 unitarily comprises a rib 38. Lead wires 41 from the push buttons 23 through 25 pass through this rib 38 and the hole 30a in the holding plate 30, and are connected to circuits within the main camera body 11.

Normally, the locking member 35 is urged in the direction of an arrow A in FIG. 4B due to the leaf spring 34, and one end of the locking member 35 enters within one of the cutouts 30b through 30d of the holding plate 30 to prevent the angular rotation of the holding plate 30, that is, the angular rotation of the holding part 30. That is, in this state, the holding part 15 is locked at an angularly rotated position determined by one of the cutouts 30b through 30d. On the other hand, if the push button 36 is pushed in the direction of an arrow B in FIG. 4B against the force exerted by the leaf spring 34, one end of the locking member 35 slips out of one of the cutouts 30b through 30d, and recedes within the slot 32 as indicated by a two-dot chain line in FIG. 4B. Hence, the locking with respect to the holding plate 30 is released in this state, and the holding part 15 becomes angularly rotatable. When the push button 36 is pushed to release the locking with respect to the holding plate 30 and the holding part 15 is slightly rotated angularly, the bottom surface of the holding plate 30 makes contact with the locking member 35 which is receded within the slot 32, and the locking member 35 is maintained in the lock released state. Thus, it is not necessary to continue pushing the push button 36 while the holding part 15 is being rotated angularly. When the push button 36 is pushed and the holding part is rotated angularly in one direction, the locking member 35 enters within the cutout in the holding plate 30 as the locking member 35 approaches one of the cutouts 30b through 30d, to lock the holding part 15 again at an angularly rotated position determined by the cutout.

Due to the locking operation of the locking member 35 with respect to the holding plate 30, the holding part 15 is locked at angularly rotated positions S1, S2, and S3 shown in FIG. 1. In a state where the holding part 15 is locked at the angularly rotated positions S1 through S3, the locking member 35 is within the cutouts 30b through 30d of the holding plate 30, respectively. The holding part 15 is locked so as not to rotate clockwise exceeding the angularly rotated position S1 shown in FIG. 1, and similarly locked so as not to rotate counterclockwise exceeding the angularly rotated position S3. Therefore, the holding part 15 cannot be rotated clockwise exceeding the angularly rotated position S1, or rotated counterclockwise exceeding the angularly rotated position S3, even if the push button 36 is pushed.

In a state where the holding part 15 is held by the right hand of the operator, the index finger may be positioned on the push button 23, and the middle finger may be positioned on the push button 24. Thus, the lens system 12 can be adjusted with ease. Further, the push button 36 is arranged at a position for easy access by the index finger, and the start button 25 may be manipulated by the thumb.

When the holding part 15 is at the angularly rotated position S1 shown in FIG. 1, the holding part 15 assumes a position shown in FIG. 3 with respect to the left side surface 11a of the main camera body 11 because the rotary axis a is shifted by the angle α from the straight line b. In FIG. 3, an inner surface 19a of the grip part 19 is separated from the left side surface 11a of the main camera body 11 at a rear part thereof, and forms a space 40. Accordingly, the operator can easily hold the holding part 15 at the angularly rotated position S1, and the push buttons 23 through 25 can be manipulated with ease. The above angularly rotated position S1 is a so-called accommodated position. Generally, the camera 10 is placed directly on the floor or a tripod for image pickup, when the holding part 15 is at the accommodated position. According to the present embodiment of the invention, the camera 10 can be operated with ease at this accommodated position of the holding part 15, due to the formation of the above space 40.

Next, the locking by the locking member 35 with respect to the holding plate 30 is released when the push button 36 is pushed, and the holding part 15 becomes angularly rotatable counterclockwise in FIG. 1. As the holding part 15 approaches the angularly rotated position S2 between the positions S1 and S3, the locking member 35 enters within the cutout 30c in the holding plate 30 as described before, to lock the holding part 15 at the intermediate position S2. The holding part 15 becomes substantially parallel to the vertical plane P at this angularly rotated position S2, to enable support of the camera 10 in the vicinity of the center of gravity thereof. Accordingly, the camera 10 can be supported in a balanced state at this intermediate position S2, and the camera 10 can be supported at the operator's side with ease for image pickup. Moreover, because the camera 10 can be supported in a balanced state at the intermediate position S2, this intermediate position is especially suited for high angle and low angle image pickup.

Figure 5:
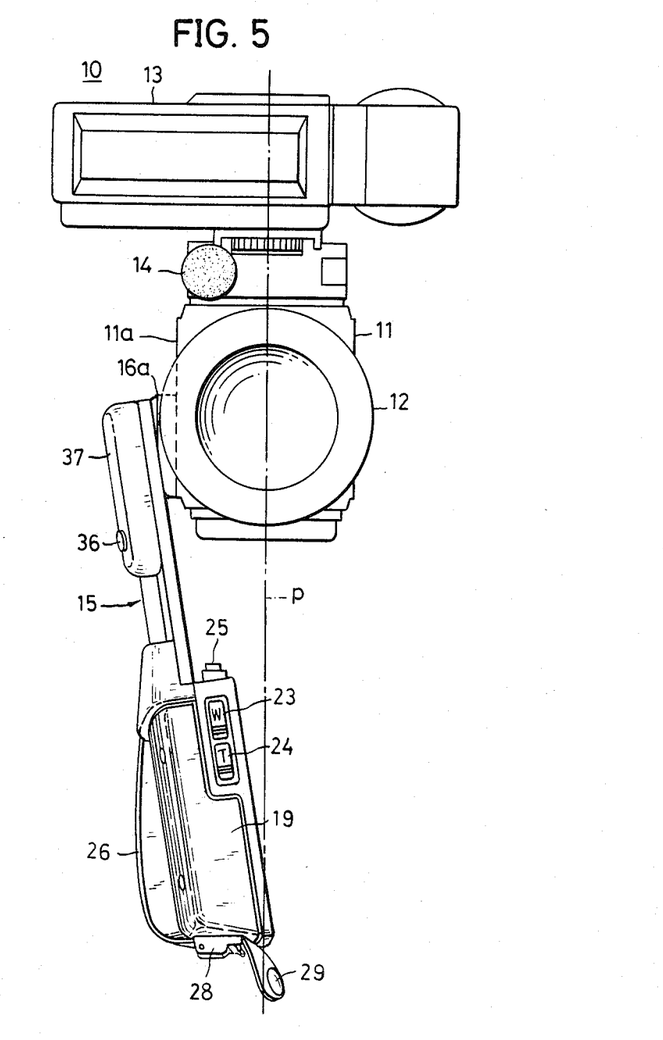
FIGS. 5 and 6 are a front view and a plan view respectively showing the image pickup device shown in FIG. 1 in a state where the holding part is at an angularly rotated position in front of the image pickup device.
Figure 6:
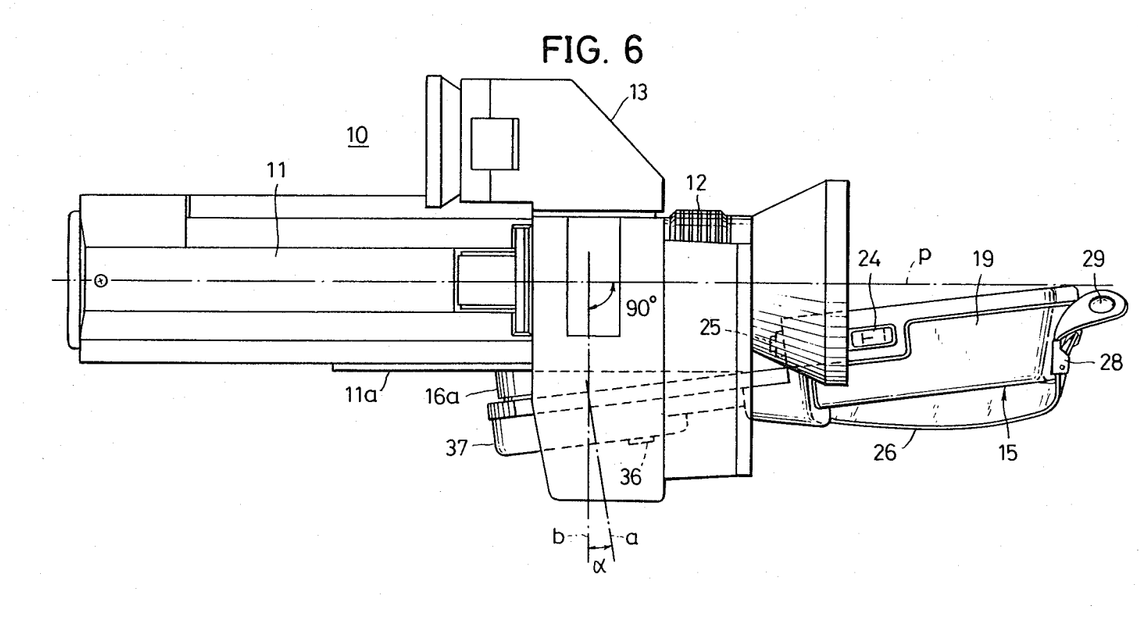

Next, when the push button 36 is pushed and the holding part 15 is angularly rotated counterclockwise in FIG. 1, the locking member 35 enters within the cutout 30d in the holding part 30 to lock the holding part at the angularly rotated position S3. In a state where the holding part 15 is locked at the angularly rotated position S3, the grip part 19 is drawn out to a fully rotated position in front of the camera 10 as shown in FIGS. 5 and 6, and the grip part 19 lies within the vertical plane P. For this reason, when the operator holds the grip part 19 by his right hand and rests the rear part of the main camera body 11 of his shoulder, the camera 10 becomes supported at the front and rear parts thereof which lie within the vertical plane P. That is, the camera 10 becomes supported at two points on the vertical plane P. Accordingly, the camera 10 does not become unbalanced even when the operator moves, to enable fine image pickup. Furthermore, as shown in FIG. 5, the grip part 19 is inclined towards the camera from the side surface of the main camera body 11 at the fully rotated position S3. This inclination of the grip part 19 makes it possible to grip the grip part 19 by the right hand in a most natural position, and enables easy access to the push buttons 23 through 25. In addition, because the grip part 19 lies within the vertical plane P at this fully rotated position S3, the camera 10 can be rested on a table, floor, and the like in a balanced state where the holding part 15 is locked at the fully rotated position S3. In this case, it is desirable to design the bottom surface of the grip part 19 which makes contact with the table and the like, so that the bottom surface of the grip part 19 is substantially parallel to the bottom surface of the main camera body 11 when the holding part 15 is locked at the fully rotated position S3. By designing the grip part 19 in such a manner, the camera 10 becomes even more balanced on the table and the like, and the camera 10 can be prevented from falling to the side.

Figure 7:
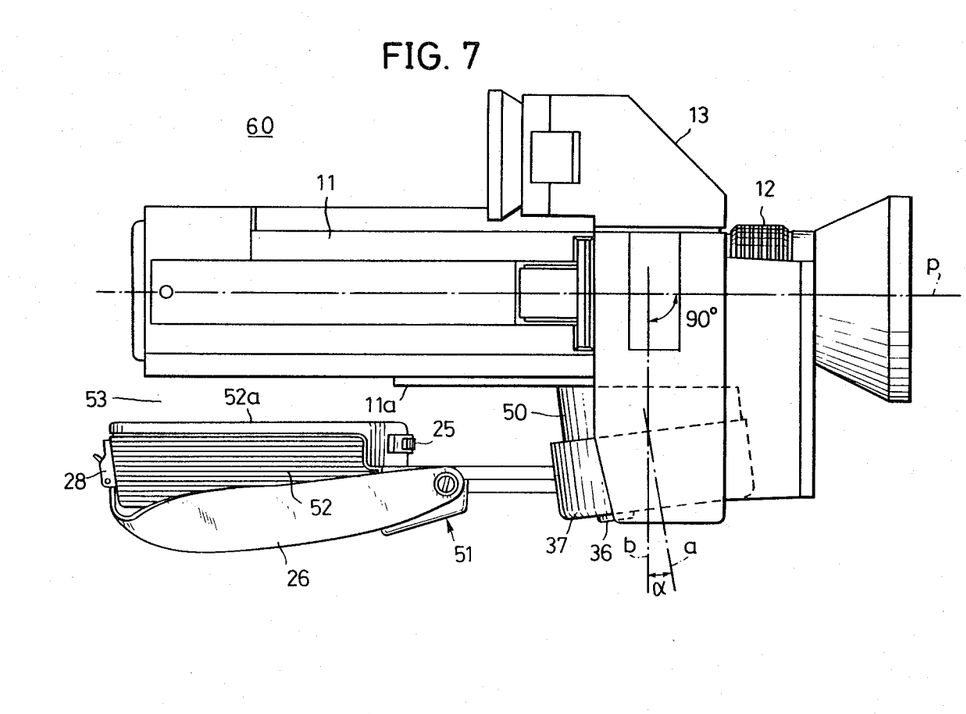
FIG. 7 is a plan view showing another embodiment of an image pickup device according to the present invention.

FIG. 7 is a plan view showing another embodiment of an image pickup device according to the present invention. In FIG. 7, those parts which are the same as those corresponding parts in FIG. 3 are designated by the same reference numerals, and their description will be omitted. In the present embodiment of the invention, a cylindrical projection 50 projects more from the left side surface 11a of the main camera body 11 of a camera 60, as compared to the cylindrical projection 16a in the previously described embodiment. Further, a holding part 51 is bent at an intermediate part thereof towards the main camera body 11. Hence, the rotary axis a of the holding part 51 is shifted by the angle α from the straight line b which is perpendicular to the vertical plane P as in the previously described embodiment, but a side surface 52a of a grip part 52 is substantially parallel to the left side surface 11a of the main camera body 11 when the holding part 51 is at its accommodated position and forms a space 53. Accordingly, the camera 60 can be operated with ease regardless of the angularly rotated position of the holding part 51, and the camera 60 can be supported in a balanced state at each of the angularly rotated positions of the holding part 51.

In the embodiments of the invention described heretofore, the holding part is designed to be locked at three angularly rotated positions. However, the number of locking positions is not limited to three, and may be two or more than three.

Moreover, in the two embodiments described heretofore, the holding part is angularly rotated in a vertical plane shifted by the angle $\alpha$ with respect to the vertical plane P, however, the rotational plane of the holding part is not limited to a vertical plane. That is, the rotational plane of the holding part may be determined according to the size of the main camera body and the length of the holding part, so that the grip part lies within the vertical plane P when the holding part is at the intermediate position or the fully rotated position.

In addition, the side surfaces of the main camera body is parallel to the vertical plane P in the embodiments described, but the side surfaces of the main camera body may be slightly inclined. Moreover, the side surfaces of the main camera body need not be flat, and may comprise slight curves.

Further, the present invention is not limited to these embodiments, but various variations and modifications may be made without departing from the scope of the present invention.

What is claimed is:

1. An image pickup device comprising:
   a main image pickup body; and
   a holding part being angularly rotatable on one side surface of said main image pickup body,
   said holding part being mounted to rotate angularly in a plane other than a plane which is parallel to a vertical plane P, said vertical plane P including a center of gravity of said image pickup device and an optical axis or a straight line parallel to said optical axis of said image pickup device,
   said holding part being separated by a predetermined distance from said one side surface of said main image pickup body at an accommodated position thereof where said holding part extends along said one side surface of said main image pickup body, and a free end of said holding part lying substantially within said vertical plane P at a fully rotated position thereof where said holding part is drawn out in front of said main image pickup body.

2. An image pickup device as claimed in claim 1 in which said holding part comprises a plurality of manipulating buttons, and said predetermined distance is selected to a distance such that said manipulating buttons can be manipulated with ease when said holding part is at said accommodated position.

3. An image pickup device as claimed in claim 2 which further comprises locking means for locking said holding part at each of the angularly rotated positions, and lock releasing means for releasing the locking with respect to said locking means to permit angular rotation of said holding part.

4. An image pickup device as claimed in claim 2 in which said holding part rotates angularly within a vertical plane shifted by a predetermined angle $\alpha$ with respect to said vertical plane P.

5. An image pickup device as claimed in claim 2 in which said holding part is at least lockable at an intermediate position between said accommodated position and said fully rotated position, and said holding part is substantially parallel to said vertical plane P when said holding part is at said intermediate position.

6. An image pickup device as claimed in claim 4 in which said predetermined angle $\alpha$ is selected to an angle in a range of 7° to 10°.

7. An image pickup device as claimed in claim 3 in which said lock releasing means comprises a push button, and said push button is one of said plurality of manipulating buttons provided on the holding part.

8. An image pickup device as claimed in claim 2 in which said holding part comprises a bent part at an intermediate part thereof so that the free end of said holding part is substantially parallel to said one side surface of said main image pickup body when said holding part is at said accommodated position.

9. An image pickup device as claimed in claim 2 in which said holding part further comprises a strap for supporting an operator's hand.

10. An image pickup device as claimed in claim 2 in which a lowermost line or surface at said free end of said holding part is substantially parallel to a bottom surface of said image pickup device when said holding part is at said fully rotated position.

* * * * *